US008469337B1

United States Patent
Hoeptner, III

(10) Patent No.: US 8,469,337 B1
(45) Date of Patent: Jun. 25, 2013

(54) FAUCET SEALING

(76) Inventor: Herbert W. Hoeptner, III, Gilroy, CA (US)

(*) Notice: Subject to any disclaimer, the term of this patent is extended or adjusted under 35 U.S.C. 154(b) by 153 days.

(21) Appl. No.: 12/932,485

(22) Filed: Feb. 28, 2011

Related U.S. Application Data

(63) Continuation-in-part of application No. 11/096,663, filed on Apr. 4, 2005, now abandoned.

(51) Int. Cl.
*F16K 1/04* (2006.01)

(52) U.S. Cl.
USPC ........... 251/357; 251/214; 251/218; 251/284; 251/333; 251/900

(58) Field of Classification Search
USPC ................. 251/318, 333, 334, 356, 357, 359, 251/900, 214, 215, 218, 229, 264, 284, 364, 251/366
See application file for complete search history.

(56) References Cited

U.S. PATENT DOCUMENTS

| | | |
|---|---|---|
| 961,505 A | 6/1910 | Little |
| 1,156,010 A | 10/1915 | Kenney |
| RE17,022 E | 7/1928 | Wilson |
| 1,884,442 A | 10/1932 | Wells et al. |
| 2,281,689 A | 5/1942 | Hare |
| 2,417,494 A | 3/1947 | Hoof |
| 2,501,657 A | 3/1950 | Barkelew |
| 2,658,716 A | 11/1953 | Winfree |
| 2,791,238 A * | 5/1957 | Bryant ...................... 137/625.34 |
| 2,898,082 A * | 8/1959 | Von Almen et al. .......... 251/333 |
| 2,960,998 A * | 11/1960 | Sinker et al. .................. 137/542 |
| 2,994,343 A * | 8/1961 | Banks ......................... 137/454.5 |
| 3,226,079 A * | 12/1965 | Shaw et al. .................... 251/218 |
| 3,892,383 A | 7/1975 | Hesse |
| 4,176,674 A | 12/1979 | Rodriguez |
| 4,474,358 A | 10/1984 | Bennett |
| 5,083,589 A | 1/1992 | Wilcock |
| 5,103,857 A | 4/1992 | Kuhn et al. |
| 5,123,445 A | 6/1992 | Chung-Shan |
| 6,457,614 B1 | 10/2002 | Amidzich |
| 7,395,831 B2 | 7/2008 | Hoeptner |
| 7,409,964 B2 * | 8/2008 | Hoeptner, III ................ 137/218 |

\* cited by examiner

*Primary Examiner* — J. Casimer Jacyna
(74) *Attorney, Agent, or Firm* — William W. Haefliger

(57) ABSTRACT

A faucet, which includes a seat defining a bore, and a one-piece construction metallic valve stem movable toward and away from the seat, the improvement comprising retainer structure associated with a lower end portion of the structure defining a head to locate in axial alignment with the bore, and a shank, and a non-metallic elastomeric O-ring installed on the shank, the O-ring sized to fit the bore between the head and stem structure above the shank, the O-ring received in the bore and captivated to directly seal off between the shank and the bore, seating with the bore, and a second O-ring carried by the stem and sealing off between the stem and a second bore defined by a bonnet as the first defined O-ring is moved by the stem toward and away from the first defined bore.

11 Claims, 4 Drawing Sheets

US 8,469,337 B1

FAUCET SEALING

This application is a continuation-in-part of prior U.S. Ser. No. 11/096,663, filed Apr. 4, 2005 now abandoned.

BACKGROUND OF THE INVENTION

This invention relates generally to sealing of faucets, when closed, and more particularly to replacement of seals in faucets, to achieve superior sealing performance.

In the past, faucet seals were typically flat-sided, annular in shape, for pressing of a flat side against an annular metallic seat; or washer, when the seal was displaced axially as during faucet closing. Such annular, flat-sided seals depended upon substantial axial force exertion of a valve stem to develop seal deformation and sealing, and such force exertion increased the development of rubbing friction at interengaged rubber and metallic pressure transmitting surfaces, during relative rotation of such surfaces. Repeated faucet opening and closing often led to unwanted early wear and seal failure. A long felt need has existed for a solution to such conventional faucet seal wear and required replacement.

SUMMARY OF THE INVENTION

It is a major object of the invention to provide improved faucet sealing means, offering a solution to the above difficulties, and a means for improving the sealing of conventional faucets.

A further object includes provision of a valve stem metallic lateral and annular surface engaging the seat, radially outwardly of the top level of an O-ring seal. The valve stem typically defines a metallic skirt surrounding the metallic seat.

An added object includes provision of an elastomeric O-ring the radially outermost extent of which engages the flow bore, below the level of the metallic seat, which is engaged by the stem under-surface to define a metal-to-metal annular seal therewith. Two seals are thereby provided; a metal-to-metal annular seal and an elastomer-to-metal seal, within the bore. In this regard, an O-ring retention screw head typically defines a flat annular retention surface directly below the annular extent of the O-ring; and that flat annular surface has a periphery directly below about ⅔ of the bulk of the O-ring, whereby water pressurized deflection of the seal is upwardly and outwardly away from the screw head, and toward the metal-to-metal seal.

The invention also contemplates a method of repairing a faucet having a seat defining a bore, a valve stem, a flat annular seal to engage the seat above the bore, and a retention screw, the method including:
  i) removing the retention screw and removing the existing annular seal,
  ii) installing an elastomeric O-ring seal on the shank of screw, or a replacement screw, the O-ring seal provided to fit in faucet flow bore,
  iii) and threadably attaching the screw to the faucet stem so that the O-ring is received in said flow bore to seal off between the shank and the bore.

A further object is to provide in such a faucet configuration a bonnet surrounding and in threaded engagement with the stem, in axially spaced relation to the stem undersurface, and a second O-ring carried by the stem and sealing off between the stem and a second bore defined by the bonnet as the first defined O-ring is moved by the stem toward and away from said first defined bore, the stem typically having one-piece configuration to carry both of the O-rings. In this regard, the second O-ring typically remains in sliding engagement with said second bore in all axial positions of the second O-ring.

Yet another object comprises provision of an annular groove in the side of the stem for receiving the second O-ring, the stem having external threading extending axially into proximity to said annular groove, said external threading having said threaded engagement with said bonnet, the annular groove being in axial alignment with the stem defined metallic skirt. Also, the bonnet is axially removable from the faucet body, enabling replacement of both O-rings.

The above configurations of elements contribute to the simplicity, compactness, and reliability of faucet operation, enabling ease of replacement of both O-rings.

These and other objects and advantages of the invention, as well as the details of an illustrative embodiment, will be more fully understood from the following specification and drawings, in which:

DRAWING DESCRIPTION

DETAILED DESCRIPTION

Figure 1:
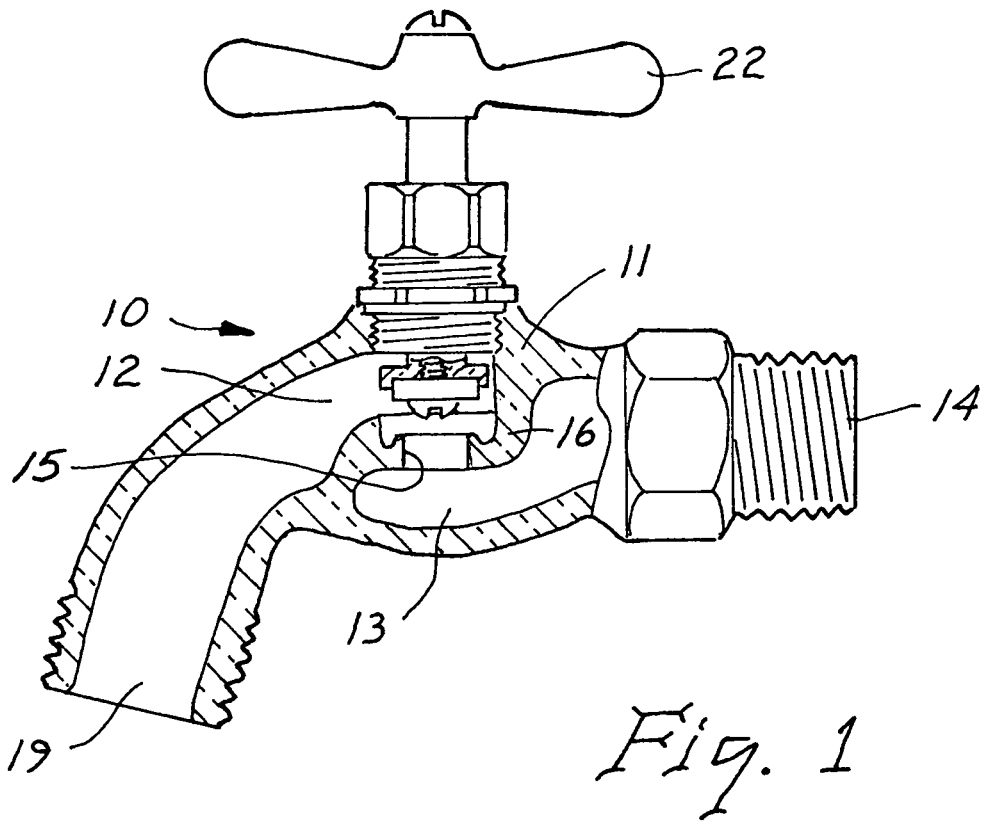
FIG. 1 is a section taken through an existing conventional faucet assembly.
Figure 1A:
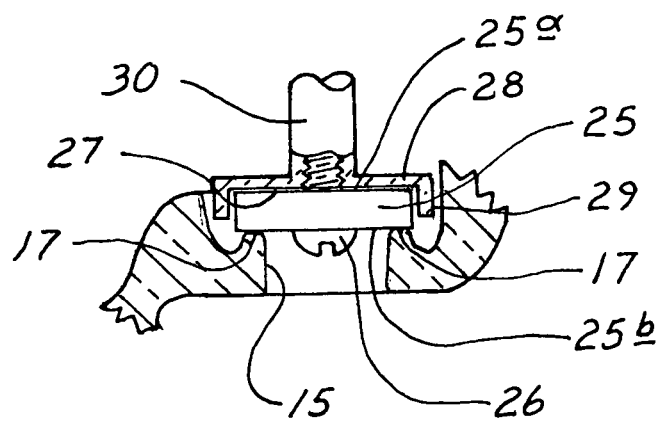
FIG. 1a is an enlarged fragmentary section showing the method of sealing in the FIG. 1 faucet.

Referring first to FIGS. 1 and 1a, an existing faucet 10 includes a body 11 defining upper and lower interior chambers 12 and 13. Inlet 14 delivers liquid such as water to chamber 13, for controlled flow through a bore 15 in interior wall 16. An upwardly projecting annular valve seat 17 is formed at the upper end of the bore. When the valve is opened, liquid flows through the bore and past the seat to upper chamber 12, and discharges at spout 19.

A valve stem 30 is movable upwardly to open the valve, and downwardly to close the valve. Handle 22 is rotatable to control upward and downward stem movement, and interengaged threads 23 and 24 carried on the stem and on the body offset stem movement, as the handle is rotated.

Referring to FIG. 1a, an annular rubber washer 25 is carried by the stem 30 to downwardly engage the seat 17, for sealing. A screw 26 holds the washer in position, within a cavity 27 in a stem flange 28. Skirt 29 bounds the washer periphery. The washer has flat, horizontal upper and lower sides 25a and 25b, and lower side 25b deteriorates due to rotary rubbing or frictional pressure contact with narrow width seat 17, which tends to "groove" the washer.

Figure 2:
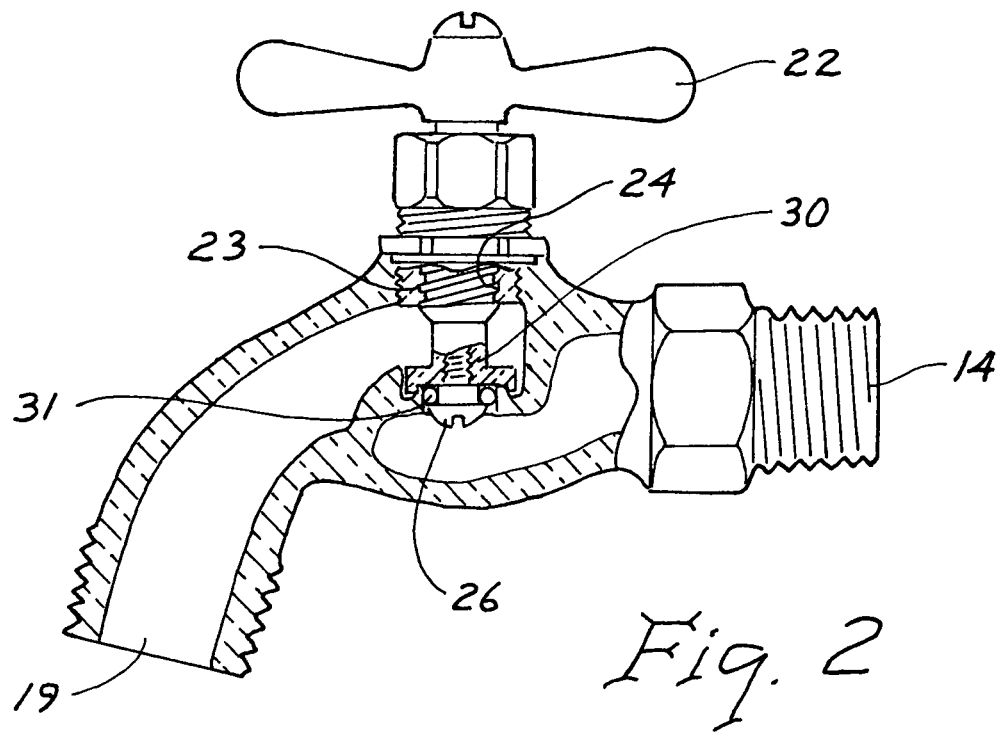
FIG. 2 is a section taken through a faucet embodying the invention, employing an O-ring seal.
Figure 2A:
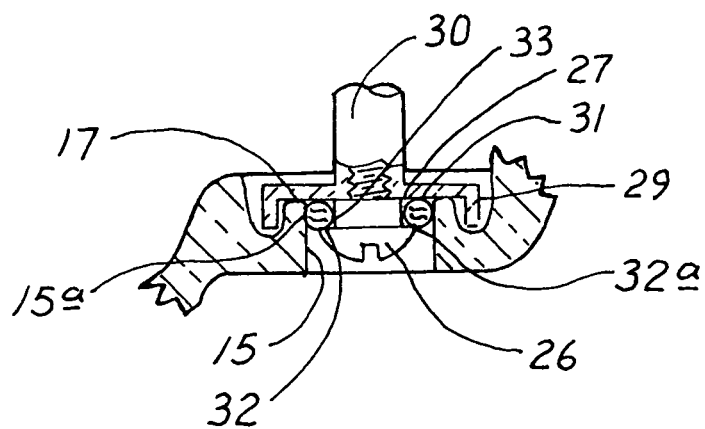
FIG. 2a is an enlarged fragmentary section showing the method of sealing in the FIG. 2 faucet.
Figure 3:
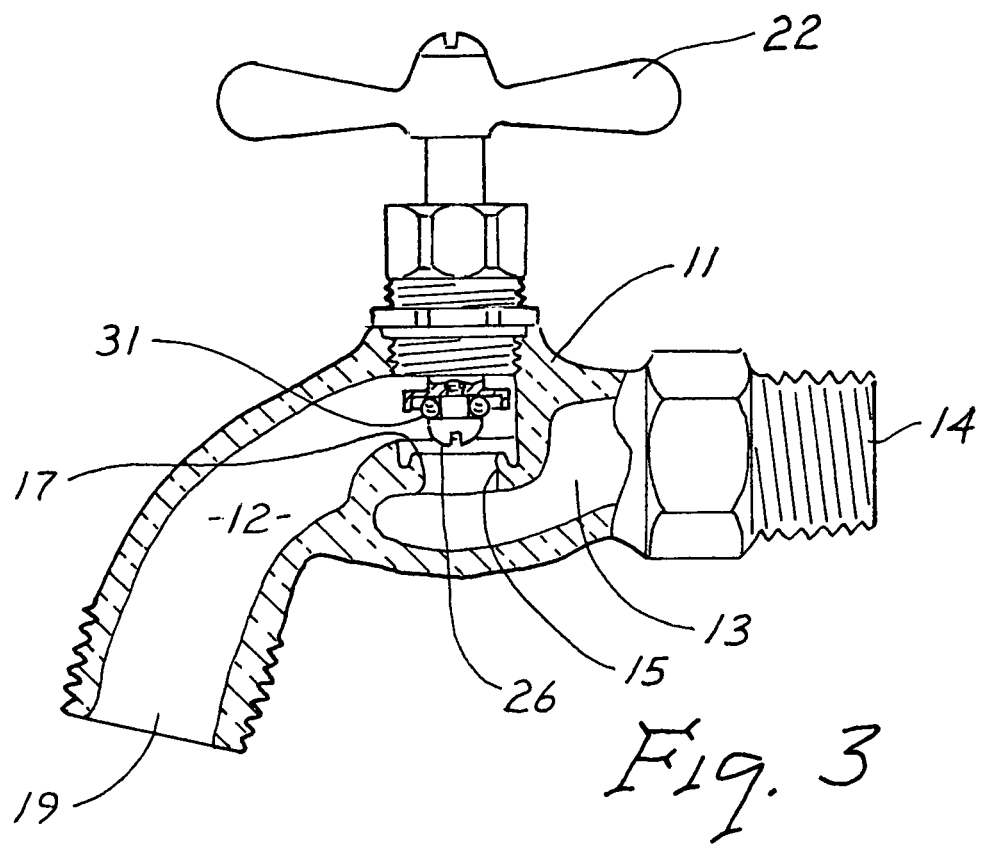
FIG. 3 shows the FIG. 2 faucet in open condition.

Referring now to FIGS. 2 and 2a, the washer 25 has been removed, and a new replacement seal installed. That seal is in the form of an annular O-ring 31 positioned so that it does not press downwardly on metallic seat 17, and avoids rubbing rotary frictional contact with that narrow width seat, thereby avoiding the groove formation problem. The valve stem and O-ring are typically characterized by one or more of the following:

i) the O-ring fits in the bore 15, between lateral surfaces 27 and 32 defined by the valve stem and screw head; and between longitudinal annular surfaces 15a and 33 defined by the bore and the screw shank, ii) the top level of the O-ring is at or proximate a horizontal plane defined by the seat, iii) the valve stem defines a metallic lateral and annular surface 27 engaging the seat, radially outwardly of the top level of the O-ring, iv) the valve stem defines a metallic skirt 29 surrounding the seat, and spaced from O-ring 31, v) the O-ring typically consists of an elastomeric material, vi) radially outermost extent of the O-ring engages the bore at 15a spaced below the level of the seat 17.

Also, the engagement of the stem surface 27 and seat 17 defines a metal-to-metal annular seal or stop, spaced upwardly and radially outwardly of the annular seal defined by engagement of the O-ring with the bore. Further, the screw head 26 defines a flat annular surface 32 directly below the major extent of the O-ring. The screw head flat annular surface 32 has a periphery 32a directly below and medially of the outer ½ of the bulk of the O-ring. In FIG. 2a, the O-ring is not compressed, when the surface 27 engages seat 17.

In accordance with a further aspect of the invention, the method of repairing a faucet having a seat defining a bore, a valve stem, and an existing flat annular seal to annularly engage the seat above the bore, and a retention screw, with a replacement seal includes:

i) removing the retention screw and removing the existing defective annular seal, ii) installing an O-ring seal on the shank of the screw, or a replacement screw, the O-ring seal provided to fit in the bore, iii) and threadably attaching the screw to the stem so that the O-ring is received in the bore to seal off between the shank and said bore.

As referred to, the method of use includes advancing the stem toward the bore, to engage the metal stem with the metal seat, above the level of O-ring sealing with the bore, whereby a dual sealing action is achieved. Should the outer surface of the O-ring wear, in use, the O-ring will still seal due to liquid pressure exertion on the seal, tending to expand it against the bore.

Figure 4:
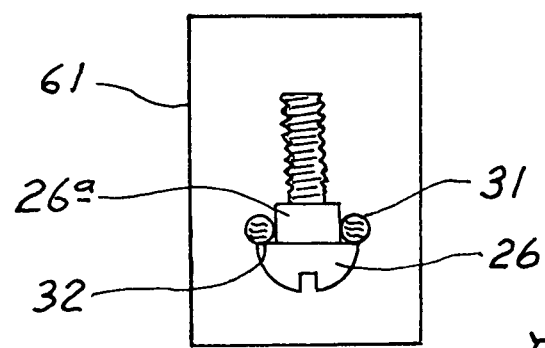
FIG. 4 shows the O-ring assembled to a retention screw, as used in FIGS. 2 and 3, and providing a kit in a container, to be sold as in hardware stores as a replacement seal and retainer, for use in a homeowner's faucet needing seal replacement.

FIG. 4 shows a kit 60 that includes a container 61, and replacement parts 26 and 31 within the container, for example to be sold to a homeowner, for faucet repair, including seal replacement. O-ring 31 may be bond attached to the screw shank 26a, or to screw head surface 32.

Figure 5:
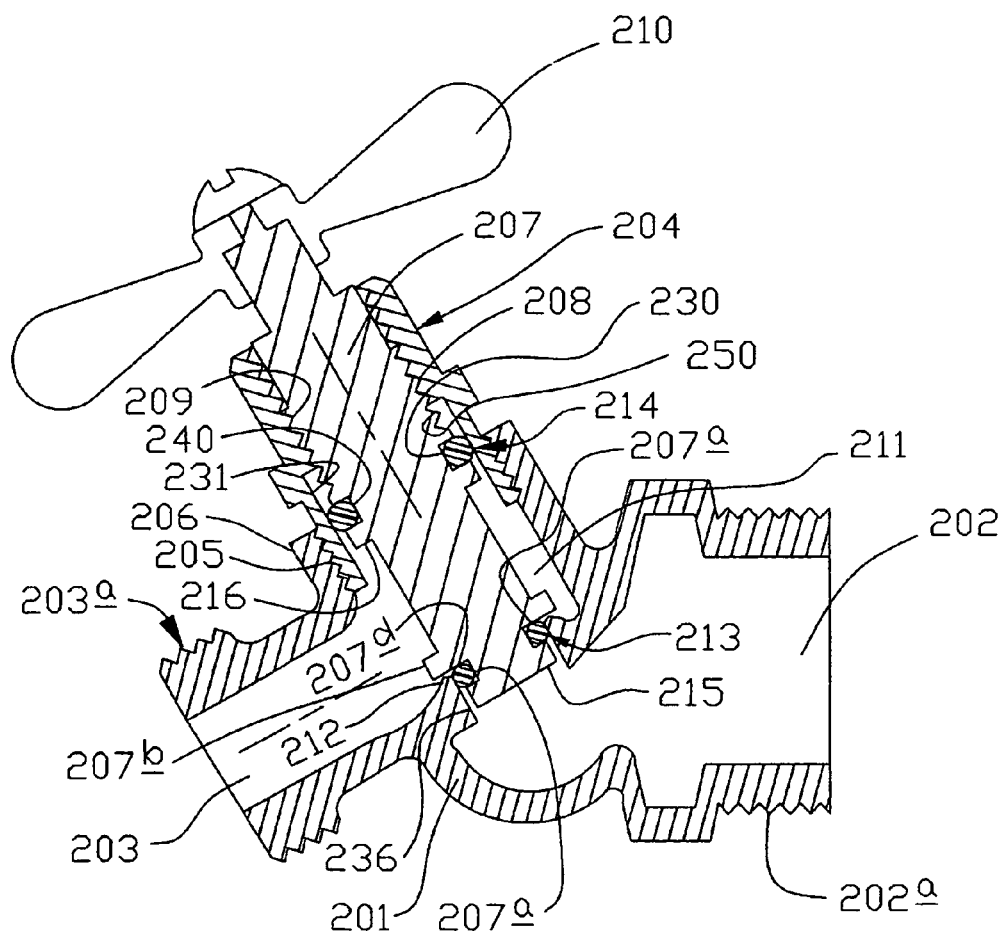
FIG. 5 shows a modified faucet having additional unusual advantages in construction, operation and results.

Referring now to FIG. 5, it shows a modified faucet 200, in closed position. The faucet hollow body 201 has a flow entrance 202, and exit 203, with associated threading at 202a and at 203a for accepting duct threads and hose threads. A tubular bonnet 204 is thread connected at 205 with body flange 206, and a stem 207 has external thread 208 connected with bonnet internal threading 209, whereby turning of handle 210 advances or retracts the stem in the bonnet and also in the body cavity 211, for opening and closing the faucet.

The body incorporates an annular seat 212 in the path of stem axial movement toward and away from the seat, the stem being of one-piece metallic configuration, and carrying two elastomeric O-rings 213 and 214. O-ring 213 is axially retained in position at the distal end of the stem by a head 215 integral with the one-piece stem; and O-ring 214 is axially retained in position at the side of the stem by an annular, radially projecting flange 216, having an outer diameter greater than the diameter of the head. Accordingly, the O-ring 213 has an overall diameter less than the overall diameter of the O-ring 214, and the cross sectional dimension of 214 is greater than the cross sectional dimension of 213, as shown.

The stem has a reduced diameter shank at 207a about which O-ring 213 fits, and the stem has radially protruding stop structure at 207b above the shank, whereby a groove 207c in the stem is defined to receive the O-ring 213, for sealing off between the stem shank and the body bore 236 as the O-ring 213 slides axially against the bore in response to stem axial displacement. Accordingly the O-ring 213 flatly engages a stem under surface 207d that faces the head.

The top level of the O-ring 213 is located radially inwardly of stem defined metallic skirt or stop 207b that engages metallic annular seat 212 defined by the body, for limiting stem movement turned the seat, such metal-to-metal engagement located radially outwardly of the top level of the O-ring 213. That O-ring directly engages the metallic stem outer surface at the top level of the seat in valve or faucet closed position. As a result, the O-ring 213 is captivated between said head and stem undersurface in an axial position of the stem so that the O-ring remains accurately radially and longitudinally positioned for peripheral radial seating with the bore during O-ring sliding, said stem undersurface overlying both the O-ring and said seat to engage the seat and limit stem axial movement, and thereby also captivate the O-ring radially.

Further, the second O-ring 214 which is carried by the stem slideably seals off between the stem shank at 230 and a second axial bore surface 231 defined by the bonnet as the first O-ring 213 is axially moved by the stem.

Accordingly, O-ring 213 remains in sliding engagement with body bore surface 236, as O-ring 214 slides axially against bonnet bore surface 231, during stem axial displacement in response to turning of the handle. In this regard, an annular groove 240 is defined by the stem to receive the second O-ring 214, and the stem external threading at 208 extends axially into proximity with that annular groove, proximate the distal end of the bonnet, that threading 208 extending in threaded engagement with the bonnet. Groove 240 is in axial alignment with the stem defined metallic skirt.

Also, the bonnet defines an annular shoulder 250 axially engaged by O-ring 214 to limit retraction of the stem relative and the above described seat.

The highly compact and simple construction of the faucet and its elements enables bonnet removal from the faucet body for gaining access to both O-rings 213 and 214, for selective replacement thereof.

Finally it will be noted that endwise metal-to-metal seating of the stem on the body seat does not disturb the radial sealing functions of either O-rings, enhancing their lifetime effectiveness for reliable faucet operation.

I claim:

1. A faucet, which includes
   a) a seat defining a bore,
   b) and a one-piece construction metallic valve stem movable toward and away from the seat,
   the improvement comprising
   c) retainer structure associated with a lower end portion of said structure defining a head to locate in axial alignment with said bore, and a shank,
   d) and a non-metallic elastomeric O-ring installed on the shank, thereby extending about and engaging the shank, the O-ring sized to fit the bore between said head and stem structure above the shank, e) the O-ring received in said bore to directly seal off between the shank and said bore, and
in alignment with said head, and so that the O-ring directly flatly engages a stem undersurface that faces the head,
f) and wherein the O-ring is fitted in the bore, between and in engagement with a metallic lateral undersurface defined by the valve stem and a lateral surface defined by the head, and between and in engagement with longitudinal annular surfaces defined by the bore and shank, said surface defined by the shank being cylindrical and thread free, the top level of the O-ring located radially inwardly of a stem defined metallic skirt that engages said seat, the stem undersurface provided to have direct metal-to-metal engagement with the seat for limiting stem movement toward the seat, said engagement located radially outwardly of the top level of the O-ring, which directly engages said metallic stem undersurface and at the top level of said seat,
g) the O-ring captivated between said head and stem undersurface in an axial position of the stem so that the O-ring remains accurately radially positioned for peripheral radial seating with the bore, said stem undersurface overlying both the O-ring and said seat to engage the seat and limit stem axial movement, and thereby also captivate the O-ring radially,
h) the faucet including a tubular bonnet surrounding and in threaded engagement with the stem in axially spaced relation to the stem undersurface, and a second O-ring carried by the stem and sealing off between the stem and a second bore defined by the bonnet as the first defined O-ring is moved by the stem toward and away from said first defined bore,
i) and wherein each of the first and second O-rings consists of elastomeric material, the first and second O-rings being annular to define diameters, the second O-ring annular diameter exceeding the first O-ring annular diameter.

2. The faucet of claim 1 wherein the second O-ring remains in sliding engagement with said second bore in all axial positions of the second O-ring.

3. The faucet of claim 1 including an annular groove defined by the stem and receiving the second O-ring, the stem having external threading extending axially into proximity to said annular groove, said external threading having said threaded engagement with said bonnet.

4. The faucet of claim 3 wherein said annular groove is in axial alignment with said stem defined metallic skirt.

5. A faucet, which includes
a) a seat defining a bore,
b) and a one-piece construction metallic valve stem movable toward and away from the seat,
the improvement comprising
c) retainer structure associated with a lower end portion of said structure defining a head to locate in axial alignment with said bore, and a shank,
d) and a non-metallic elastomeric O-ring installed on the shank, thereby extending about and engaging the shank, the O-ring sized to fit the bore between said head and stem structure above the shank,
e) the O-ring received in said bore to directly seal off between the shank and said bore, and in alignment with said head, and so that the O-ring directly flatly engages a stem undersurface that faces the head,
f) and wherein the O-ring is fitted in the bore, between and in engagement with a metallic lateral undersurface defined by the valve stem and a lateral surface defined by the head, and between and in engagement with longitudinal annular surfaces defined by the bore and shank, said surface defined by the shank being cylindrical and thread free, the top level of the O-ring located radially inwardly of a stem defined metallic skirt that engages said seat, the stem undersurface provided to have direct metal-to-metal engagement with the seat for limiting stem movement toward the seat, said engagement located radially outwardly of the top level of the O-ring, which directly engages said metallic stem undersurface and at the top level of said seat,
g) the O-ring captivated between said head and stem undersurface in an axial position of the stem so that the O-ring remains accurately radially positioned for peripheral radial seating with the bore, said stem undersurface overlying both the O-ring and said seat to engage the seat and limit stem axial movement, and thereby also captivate the O-ring radially,
h) the faucet including a tubular bonnet surrounding and in threaded engagement with the stem in axially spaced relation to the stem undersurface, and a second O-ring carried by the stem and sealing off between the stem and a second bore defined by the bonnet as the first defined O-ring is moved by the stem toward and away from said first defined bore,
i) and wherein the bonnet defines an annular shoulder axially engageable by the second O-ring, to limit retraction of the stem relative to the seat.

6. A faucet, which includes
a) a seat defining a bore,
b) and a one-piece construction metallic valve stem movable toward and away from the seat,
the improvement comprising
c) retainer structure associated with a lower end portion of said structure defining a head to locate in axial alignment with said bore, and a shank,
d) and a non-metallic elastomeric O-ring installed on the shank, thereby extending about and engaging the shank, the O-ring sized to fit the bore between said head and stem structure above the shank,
e) the O-ring received in said bore to directly seal off between the shank and said bore, and in alignment with said head, and so that the O-ring directly flatly engages a stem undersurface that faces the head,
f) and wherein the O-ring is fitted in the bore, between and in engagement with a metallic lateral undersurface defined by the valve stem and a lateral surface defined by the head, and between and in engagement with longitudinal annular surfaces defined by the bore and shank, said surface defined by the shank being cylindrical and thread free, the top level of the O-ring located radially inwardly of a stem defined metallic skirt that engages said seat, the stem undersurface provided to have direct metal-to-metal engagement with the seat for limiting stem movement toward the seat, said engagement located radially outwardly of the top level of the O-ring, which directly engages said metallic stem undersurface and at the top level of said seat,
g) the O-ring captivated between said head and stem undersurface in an axial position of the stem so that the O-ring remains accurately radially positioned for peripheral radial seating with the bore, said stem undersurface overlying both the O-ring and said seat to engage the seat and limit stem axial movement, and thereby also captivate the O-ring radially,
h) the faucet including a tubular bonnet surrounding and in threaded engagement with the stem in axially spaced relation to the stem undersurface, and a second O-ring carried by the stem and sealing off between the stem and a second bore defined by the bonnet as the first defined O-ring is moved by the stem toward and away from said first defined bore, i) there being an annular groove defined by the stem and receiving the second O-ring, the stem having external threading extending axially into proximity to said annular groove, said external threading having said threaded engagement with said bonnet, j) and wherein the bonnet defines the annular shoulder axially engageable by the second O-ring, to limit retraction of the stem relative to the seat.

7. The faucet of claim 1 wherein said head is integral with the stem.

8. The faucet of claim 6 wherein said head is integral with the stem.

9. The faucet of claim 1 wherein the bonnet is axially removable from the faucet body, enabling replacement of both O-rings.

10. The faucet of claim 1 wherein both O-rings have inner convex surfaces in direct engagement with surfaces of the stem that faces toward the O-rings and away from an axis defined by the stem.

11. The faucet of claim 10 wherein there is spacing between the O-ring axially of the stem that exceeds the overall diameter of the first defined O-ring.

* * * * *